(12) United States Patent
Kim

(10) Patent No.: US 11,621,616 B2  
(45) Date of Patent: Apr. 4, 2023

(54) APPARATUS FOR TWISTING WELDING PORTION OF SEGMENT TYPE STATOR COIL

(71) Applicants: Hyundai Motor Company, Seoul (KR); Kia Motors Corporation, Seoul (KR)

(72) Inventor: Sugil Kim, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 91 days.

(21) Appl. No.: 17/093,983

(22) Filed: Nov. 10, 2020

(65) Prior Publication Data

US 2022/0052588 A1 Feb. 17, 2022

(30) Foreign Application Priority Data

Aug. 13, 2020 (KR) .................. 10-2020-0101492

(51) Int. Cl.
 *H02K 15/00* (2006.01)
 *H02K 3/12* (2006.01)
(52) U.S. Cl.
 CPC .......... *H02K 15/0087* (2013.01); *H02K 3/12* (2013.01)

(58) Field of Classification Search
 CPC .......... H02K 15/0087; H02K 15/0428; H02K 15/064
 See application file for complete search history.

(56) References Cited

U.S. PATENT DOCUMENTS

2013/0276295 A1 10/2013 Guercioni  
2020/0195102 A1* 6/2020 Falkner ............. H02K 15/0087

FOREIGN PATENT DOCUMENTS

JP 2004135438 A * 4/2004 ......... H02K 15/0087  
KR 20140018855 A 2/2014

\* cited by examiner

*Primary Examiner* — Livius R. Cazan  
(74) *Attorney, Agent, or Firm* — Slater Matsil, LLP

(57) ABSTRACT

An apparatus for twisting welding portions of a segment type stator coils is provided. The welding portions are in a number of layers and inserted into slots of a stator core. The apparatus includes a frame, a number of twisting jigs, and a partition member detachably provided at one of a pair of neighboring twisting jigs, and blocking the coil receiving recesses facing each other of the twisting jigs forming the pair. Each of the twisting jigs is provided for each layer of the stator coils, along a radial direction of the stator core, forming coil receiving recesses along a circumferential direction facing another twisting jig forming a pair, installed on the frame to be rotatable in different directions depending on layers of the stator coils, and is generally ring-shaped.

20 Claims, 10 Drawing Sheets

APPARATUS FOR TWISTING WELDING PORTION OF SEGMENT TYPE STATOR COIL

CROSS-REFERENCE TO RELATED APPLICATIONS

This application claims the benefit of Korean Application No. 10-2020-0101492, filed on Aug. 13, 2020, which application is hereby incorporated herein by reference.

TECHNICAL FIELD

The disclosure of the present application relates to manufacturing system of a stator of a hairpin winding type. More particularly, the disclosure relates to a twisting apparatus of a segment type stator coil for twisting welding portions of a segment type stator coils inserted into a stator core.

BACKGROUND

In general, hybrid electric vehicles or electric vehicles called environment-friendly vehicles employ a technology that generates driving torque by a drive motor. Automakers and environment-friendly parts manufacturers are applying drive motors with a stator wound with a hairpin type stator coil, for the weight and volume of vehicles and parts.

These hairpin winding type stators are manufactured through the process of inserting hairpin type stator coils into slots of the stator core and welding the ends of the stator coils.

Meanwhile, the process of manufacturing a hairpin winding type stator includes, a widening process that extends a distance between the welding portions, and a twisting process that twists the welding portion, as processes before welding the welding portion of the stator coils inserted in the slots of the stator core.

Here, the widening process is to ensure the insulation distance between the welding portions of the stator coils and also to improve the workability (welding property) in the welding process. The twisting process is to align the current movement path of the welding portion.

In the twisting process, the welding portions of stator coils are twisted using twisting jigs provided for each layer of stator coils inserted into slots of the stator core.

Therefore, conventionally, the welding portion of stator coils is inserted into the twisting jigs for each layer of the stator coils, the twisting jigs are rotated in different directions for each layer of the stator coils, and the welding portion of the stator coils may be twisted.

However, conventionally, a pocket portion into which the welding portion of stator coils is fitted is formed to the twisting jigs. The pocket portion forms a relatively thin pocket wall because the width of the twisting jig is narrow.

Accordingly, when twisting the welding portion of stator coils using a conventional twisting jig, there is a high risk of damage to the pocket wall of the pocket portion, and the twisting quality of the welding portion may be deteriorated due to damage to the pocket wall.

In addition, conventionally, when the pocket wall is damaged, the entire twisting jig has to be replaced, which is disadvantageous in terms of maintenance of the twisting jig, and may cause an increase in cost due to the replacement of the twisting jig.

The above information disclosed in this Background section is only for enhancement of understanding of the background of the invention, and therefore it may contain information that does not form the prior art that is already known in this country to a person of ordinary skill in the art.

SUMMARY

The present invention has been made in an effort to provide an apparatus for twisting welding portions of a segment type stator coil having advantages of easy maintenance of the jig for twisting the welding portions while maintaining the pocket structure for separating the layers of the stator coils.

An apparatus according to an exemplary embodiment is for twisting the welding portions of a segment type stator coil where the welding portions are in a plurality of layers and inserted into slots of a stator core, and the apparatus may include, i) a frame, ii) a plurality of twisting jigs, each of which is provided for each layer of the stator coils, along a radial direction of the stator core, forming coil receiving recesses along a circumferential direction facing another twisting jig forming a pair, installed on the frame to be rotatable in different directions depending on layers of the stator coils, and is generally ring-shaped, and iii) a partition member detachably provided at one of a pair of neighboring twisting jigs, and blocking the coil receiving recesses facing each other of the twisting jigs forming the pair.

In addition, an apparatus for twisting welding portions of segment type stator coils according to an exemplary embodiment may further include, a driving unit installed on the frame and rotating the plurality of twisting jigs in different directions for odd-numbered layers and even-numbered layers of the stator coils.

In addition, according to an apparatus for twisting welding portions of segment type stator coils according to an exemplary embodiment, the driving unit may include a plurality of drive gear members disposed on the frame along an up and down direction and respectively connected to the plurality of twisting jigs, and a plurality of servo-motors respectively connected to the plurality of drive gear members.

In addition, according to an apparatus for twisting welding portions of segment type stator coils according to an exemplary embodiment, the partition member may include, bolt engagement portions horizontally disposed on an upper surface of the twisting jig interposing the coil receiving recess, and bolt-engaged with the upper surface of the twisting jig, and a partition wall disposed between the bolt engagement portions and integrally connected to the bolt engagement portion, and vertically disposed between the coil receiving recesses facing each other of the twisting jigs.

In addition, an apparatus according to an exemplary embodiment is for twisting welding portions of a segment type stator coils where the welding portions are in a plurality of layers and inserted into slots of a stator core, and the apparatus may include, i) a frame, ii) a core gripper installed on an upper side of the frame to be movable in an up and down direction and gripping an inner circumference of the stator core, iii) a crown portion fixing jig installed on the core gripper and configured to fix a crown portion at an upper side of the stator coil, iv) a welding portion fixing jig installed on the frame and configured to fix the welding portions of the stator coils, v) a plurality of twisting jigs, each of which is provided for each layer of the stator coils, along a radial direction of the stator core, forming coil receiving recesses along a circumferential direction facing another twisting jig forming a pair, installed on the frame to be rotatable in different directions depending on layers of the stator coils, and is generally ring-shaped, and vi) a partition member detachably provided at one of a pair of neighboring twisting jigs, and blocking the coil receiving recesses facing each other of the twisting jigs forming the pair.

In addition, according to an apparatus for twisting welding portions of segment type stator coils according to an exemplary embodiment, the crown portion fixing jig may include first fixing members provided on the core gripper to be movable radially back and forth and inserted between the crown portions.

In addition, according to an apparatus for twisting welding portions of segment type stator coils according to an exemplary embodiment, the welding portion fixing jig may include second fixing members provided on the frame to be movable radially back and forth and inserted between the welding portions of the stator coils.

In addition, an apparatus for twisting welding portions of segment type stator coils according to an exemplary embodiment may further include, a driving unit installed on the frame and rotating the plurality of twisting jigs in different directions for odd-numbered layers and even-numbered layers of the stator coils.

In addition, according to an apparatus for twisting welding portions of segment type stator coils according to an exemplary embodiment, the driving unit may include, a plurality of drive gear members disposed on the frame along an up and down direction and respectively connected to the plurality of twisting jigs, and a plurality of servo-motors respectively connected to the plurality of drive gear members.

In addition, according to an apparatus for twisting welding portions of segment type stator coils according to an exemplary embodiment, the partition member may be provided in a generally ring shape and bolt-engaged with an upper surface of the twisting jig.

In addition, according to an apparatus for twisting welding portions of segment type stator coils according to an exemplary embodiment, the partition member may include, bolt engagement portions horizontally disposed on the upper surface of the twisting jig interposing the coil receiving recess, and bolt-engaged with the upper surface of the twisting jig, and a partition wall disposed between the bolt engagement portions and integrally connected to the bolt engagement portion, and vertically disposed between the coil receiving recesses facing each other of the twisting jigs.

In addition, according to an apparatus for twisting welding portions of segment type stator coils according to an exemplary embodiment, the partition member may include a plurality of unit partitions that are bolt-engaged with an upper surface of the twisting jig along the circumferential direction of the twisting jig.

In addition, according to an apparatus for twisting welding portions of segment type stator coils according to an exemplary embodiment, the unit partition may include a pair of bolt engagement portions that are horizontally disposed on the upper surface of the twisting jig interposing the coil receiving recess and bolt-engaged with the upper surface of the twisting jig, and a partition wall that is disposed between and integrally connected to the pair of bolt engagement portions, and is vertically disposed between the coil receiving recesses facing each other of the twisting jigs.

In addition, according to an apparatus for twisting welding portions of segment type stator coils according to an exemplary embodiment, a bolt engagement hole may be formed in the pair of bolt engagement portions.

In addition, according to an apparatus for twisting welding portions of segment type stator coils according to an exemplary embodiment, a bolt engagement recess connected to the bolt engagement hole may be formed on the upper surface of the twisting jig.

In addition, according to an apparatus for twisting welding portions of segment type stator coils according to an exemplary embodiment, the partition member may include a plurality of unit partitions that are disposed along the circumferential direction of the twisting jig and inserted from an upper surface of the twisting jig toward the lower surface.

In addition, according to an apparatus for twisting welding portions of segment type stator coils according to an exemplary embodiment, the unit partition may be provided as a plate type in which a central portion is bent in a thickness direction of the twisting jig.

In addition, according to an apparatus for twisting welding portions of segment type stator coils according to an exemplary embodiment, the unit partition may include, a pair of insertion portions provided at both sides of the central portion and inserted into the twisting jig in the up and down direction interposing the coil receiving recess, and a partition wall that is a central portion disposed between and integrally connected to the pair of insertion portions, and vertically disposed between the coil receiving recesses facing each other of the twisting jigs.

In addition, according to an apparatus for twisting welding portions of segment type stator coils according to an exemplary embodiment, the insertion portion may be connected to both sides of the partition wall along the circumferential direction of the twisting jig and may be bent in a thickness direction of the twisting jig.

In addition, according to an apparatus for twisting welding portions of segment type stator coils according to an exemplary embodiment, the partition wall may be provided in an open end form.

In addition, according to an apparatus for twisting welding portions of segment type stator coils according to an exemplary embodiment, an insertion slit into which the insertion portion may be inserted is formed downward from the upper surface of the twisting jig.

In addition, according to an apparatus for twisting welding portions of segment type stator coils according to an exemplary embodiment, neighboring insertion portions of the unit partitions may be fixed by washers.

In addition, according to an apparatus for twisting welding portions of segment type stator coils according to an exemplary embodiment, the washers may be bolt-engaged with the upper surface of the twisting jig.

According to an exemplary embodiment, a separate partition member is employed to partition coil receiving recesses between twisting jigs, thereby securing the strength of the twisting jigs, improving the twisting quality of the welding portions, and minimizing the risk of damage of the twisting jig.

Other effects that may be obtained or are predicted by an exemplary embodiment will be explicitly or implicitly described in a detailed description of the present invention. That is, various effects that are predicted according to an exemplary embodiment will be described in the following detailed description.

BRIEF DESCRIPTION OF THE DRAWINGS

The drawings are intended to be used as references for describing the exemplary embodiments of the present inven

Figure 1:
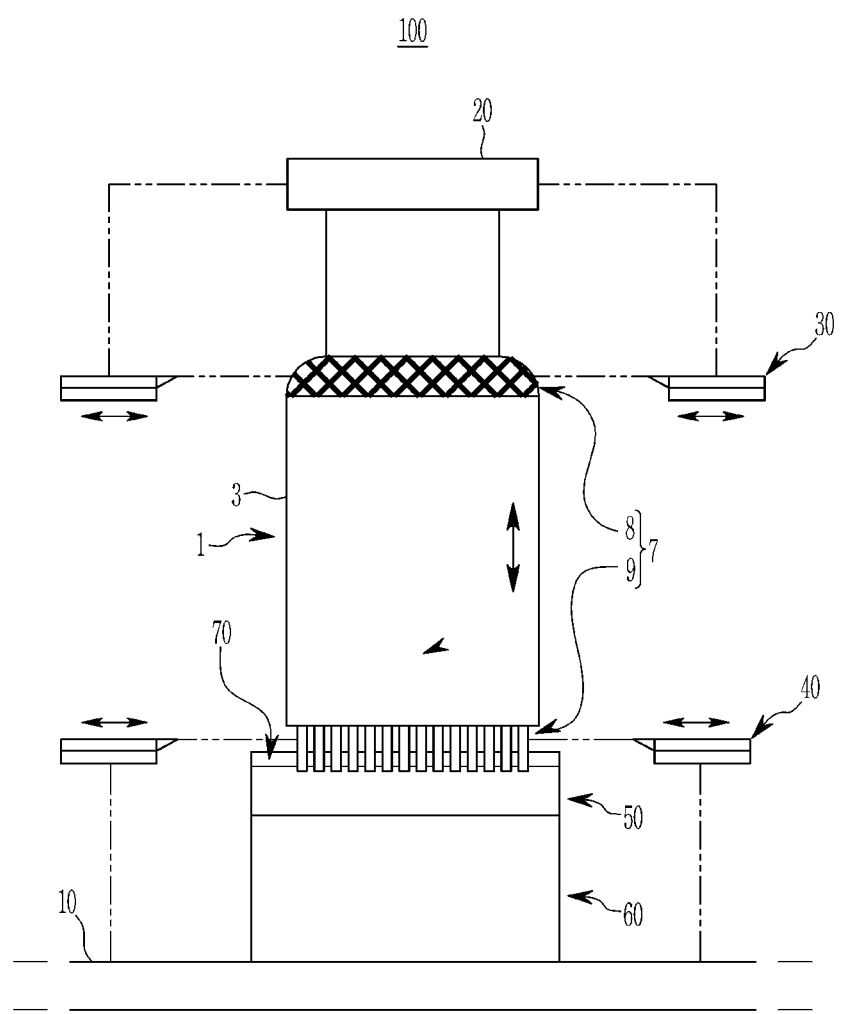
- FIG. 1 is a diagram schematically illustrating an apparatus for twisting welding portions of segment type stator coils according to an exemplary embodiment.

The following reference numerals can be used in conjunction with the drawings.

1: stator
3: stator core
7: stator coil
8: crown portion
9: welding portion
10: frame
20: core gripper
30: crown portion fixing jig
30a, 40a: driving motor
30b, 40b: driving gear
31: first fixed rail plate
33, 43: guide rail
34: first fixing member
35, 45: cam follower protrusion
37: first movable rail plate
39, 49: cam follower rail
40: welding portion fixing jig
41: second fixed rail plate
44: second fixing member
47: second movable rail plate
50: twisting jig
51: coil receiving recess
60: driving unit
61: drive gear member
63: servo-motor
70, 170, 270: partition member
71, 171: bolt engagement portion
73, 173, 273: partition wall
75, 175: bolt engagement hole
77, 177, 277: bolt engagement recess
81: bolt
100: twisting apparatus
170a, 270a: unit partition
271: insertion portion
274: insertion slit
276: washer

DETAILED DESCRIPTION OF ILLUSTRATIVE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify the present invention, parts that are not related to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

In addition, in the following description, dividing names of components into first, second, and the like is to divide the names because the names of the components are the same as each other and an order thereof is not particularly limited, In addition, unless explicitly described to the contrary, the word "comprise" and variations such as "comprises" or "comprising", will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

FIG. 1 is a diagram schematically illustrating an apparatus for twisting welding portions of segment type stator coils according to an exemplary embodiment.

Referring to FIG. 1, first of all, the hairpin winding type stator 1 applied to an exemplary embodiment may be applied to a drive motor for a hybrid electric vehicle and/or an electric vehicle as an environment-friendly vehicle that obtains driving torque by electrical energy. The drive motor includes the stator 1 applied to an exemplary embodiment, and a rotor (not shown) dispose with a certain air gap with respect to the stator 1.

In the above, the stator 1 includes a stator core 3 in which a plurality of electrical steel sheets are stacked. The stator core 3 has hairpin type stator coils 7 (commonly referred to as a conductor, segment coil, or flat coil in the industry) wound through a number of slots.

In the above, the hairpin type stator coils 7 are provided, for example, in a U-shaped or V-shaped, hairpin type with a pair of legs, and may be provided as a flat coil of a square cross-section.

Such hairpin type stator coils 7 are inserted into the slots of the stator core 3, and a pair of legs protrudes through the lower end of the slots. In addition, the leg of stator coils 7 may be welded to form an electrically connected circuit.

In the above description, an exemplary embodiment has been described as being applied to a hairpin winding type stator in a drive motor employed in an environment-friendly vehicle, but the scope of the present invention is not necessarily understood to be limited thereto. It may be understood that the technical idea of the present invention may be applied to a drive motor having a hairpin type stator of various types and uses.

Meanwhile, an apparatus 100 for twisting welding portions of a segment type stator coil according to an exemplary embodiment may be applied to the process of assembling the hairpin winding type the stator 1 during the process of assembling the drive motor.

Furthermore, an apparatus 100 for twisting welding portions of a segment type stator coil according to an exemplary embodiment may be applied for twisting welding portions 9, after the widening process of expanding the spacing between welding portions 9 of the stator coils 7 protruding from a lower end of the stator core 3, while having inserted the hairpin type stator coils 7 into the slots of the stator core 3. The reason why the welding portions 9 of the stator coils 7 are twisted is to align the current movement path of the welding portions 9.

Here, the upper end of the stator coils 7 protruding from an upper end of the stator core 3 may be defined as a crown portion 8. In addition, the welding portion 9 protruding from the lower end of the stator core 3 is arranged radially through slots along the radial direction of the stator core 3.

Furthermore, the stator coils 7 arranged along the circumferential direction at a radially outermost side are called a first layer, and layers positioned interior to the first layer along the radial direction of the stator core 3 are called a second layer, a third layer, a fourth layer, a fifth layer, a sixth layer, and so on.

Hereinafter, with reference to mounting positions of constituent elements in the drawings, a portion disposed upward is called an upper portion, an upper end, an upper surface, and an upper end portion, depending on the portion, and a portion disposed downward is called a lower portion, a lower end, a lower surface, and a lower end portion, depending on the portion.

An apparatus 100 for twisting welding portions of a segment type stator coil according to an exemplary embodiment is structured such that, regarding the inserting of the welding portion 9 of the stator coil 7, easy maintenance of the jig for twisting the welding portions 9 may be achieved while pocket structure for separating layers of the stator coils 7 is maintained.

For such a purpose, an apparatus 100 for twisting welding portions of a segment type stator coil according to an exemplary embodiment includes a frame 10, a core gripper 20, a crown portion fixing jig 30, a welding portion fixing jig 40, a twisting jigs 50, a driving unit 60, and a partition member 70.

In the above, the frame 10 is for installing various constituent elements, which will be further described below, and is installed at the bottom of a process work area. The frame 10 may be formed as a single frame or two or more frames connected to each other.

In addition, the frame 10 may include various accessory elements such as brackets, bars, rods, plates, blocks, ribs, collars, etc. for supporting various constituent elements.

However, since the above-described accessory elements are for installing constituent elements to be further described below in the frame 10, the above-described accessory elements are collectively referred to as the frame 10 except for exceptional cases.

In an exemplary embodiment, the core gripper 20 is installed on the upper side of the frame 10, movably in up and down directions. The core gripper 20 includes a finger-type gripping device that grips an inner circumference of the stator core 3 by operation of an actuator, and a lifting device for reciprocally moving the gripping device in the up and down directions.

Since such a core gripper 20 may be configured as known in the art, the configurations are not described in further detail.

In an exemplary embodiment, the crown portion fixing jig 30 is for fixing the crown portion 8 at the upper side of the stator coils 7. The crown portion fixing jig 30 is installed on the core gripper 20.

Figure 2:
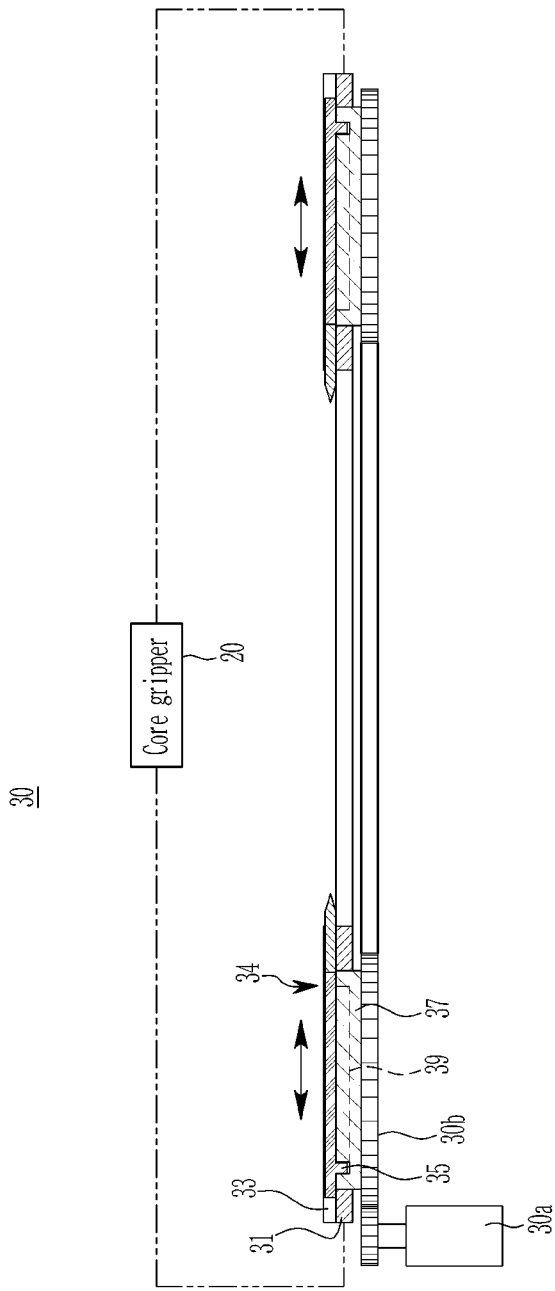
FIG. 2 illustrates a crown portion fixing jig applied to an apparatus for twisting welding portions of segment type stator coils according to an exemplary embodiment.

As shown in FIG. 2, the crown portion fixing jig 30 is provided to be movable radially back and forth on the edge of the core gripper 20 and may be inserted between the crown portions 8 of the stator coils 7.

The crown portion fixing jig 30 includes a first fixed rail plate 31 that is of a disk shape and fixedly installed on an edge side of the core gripper 20, and a plurality of first fixing members 34 installed on the first fixed rail plate 31 to be movable radially back and forth.

Guide rails 33 are radially formed on an upper surface of the first fixed rail plate 31, and the first fixing members 34 are slidably coupled with the guide rails 33 of the first fixed rail plate 31. Here, the first fixing member 34 includes a cam follower protrusion 35.

In addition, the crown portion fixing jig 30 includes, as a driving device for moving the first fixing members 34 back and forth, a first movable rail plate 37 of a disk shape rotatably installed on an edge side of the core gripper 20 through a driving motor 30a and a driving gear 30b.

The first movable rail plate 37 supports the cam follower protrusion 35 of the first fixing member 34 and forms cam follower rails 39 in cam contact with the cam follower protrusion 35.

Here, the cam follower rails 39 are formed as rail grooves of which cross-sections are curved in a round shape toward the center of the first movable rail plate 37. The cam follower protrusion 35 of the first fixing members 34 slides into the cam follower rails 39. The cam follower protrusion 35 of the first fixing member 34 is slidably coupled with the cam follower rails 39.

Referring to FIG. 1, in an exemplary embodiment, the welding portion fixing jig 40 is for fixing the welding portion 9 of the stator coils 7. The welding portion fixing jig 40 is installed on the frame 10.

Figure 3:
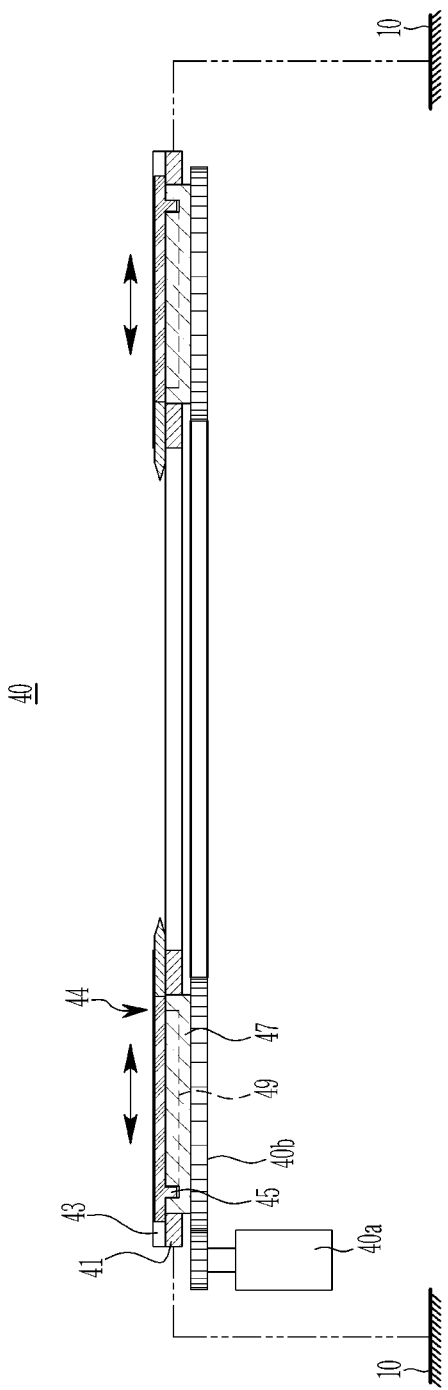
FIG. 3 illustrates a welding portion fixing jig applied to an apparatus for twisting welding portions of segment type stator coils according to an exemplary embodiment.

As shown in FIG. 3, the welding portion fixing jig 40 is provided on the frame 10 to be movable radially back and forth, and may be inserted between the welding portions 9 of the stator coils 7.

The welding portion fixing jig 40 includes a second fixed rail plate 41 of a disk shape fixedly installed on the frame 10, and a plurality of second fixing members 44 installed on the second fixed rail plate 41 to be movable radially back and forth.

Guide rails 43 are radially formed on an upper surface of the second fixed rail plate 41, and the second fixing members 44 are slidably coupled with the guide rails 43 of the second fixed rail plate 41. Here, the second fixing member 44 includes a cam follower protrusion 45.

In addition, the welding portion fixing jig 40 includes, as a driving device for moving the second fixing members 44 back and forth, a second movable rail plate 47 of a disk shape rotatably installed on the frame 10 through a driving motor 40a and a driving gear 40b.

The second movable rail plate 47 supports the cam follower protrusion 45 of the second fixing members 44 and forms cam follower rails 49 in cam contact with the cam follower protrusion 45.

Here, the cam follower rails 49 are formed as rail grooves of which cross-sections are curved in a round shape toward the center of the second movable rail plate 47. The cam follower protrusion 45 of the second fixing member 44 is slidably coupled with the cam follower rails 49.

Referring to FIG. 1, in an exemplary embodiment, the twisting jigs 50 is to substantially twist the welding portion 9 of the stator coils 7, and is provided in a ring shape and rotatably installed in the frame 10.

Figure 4:
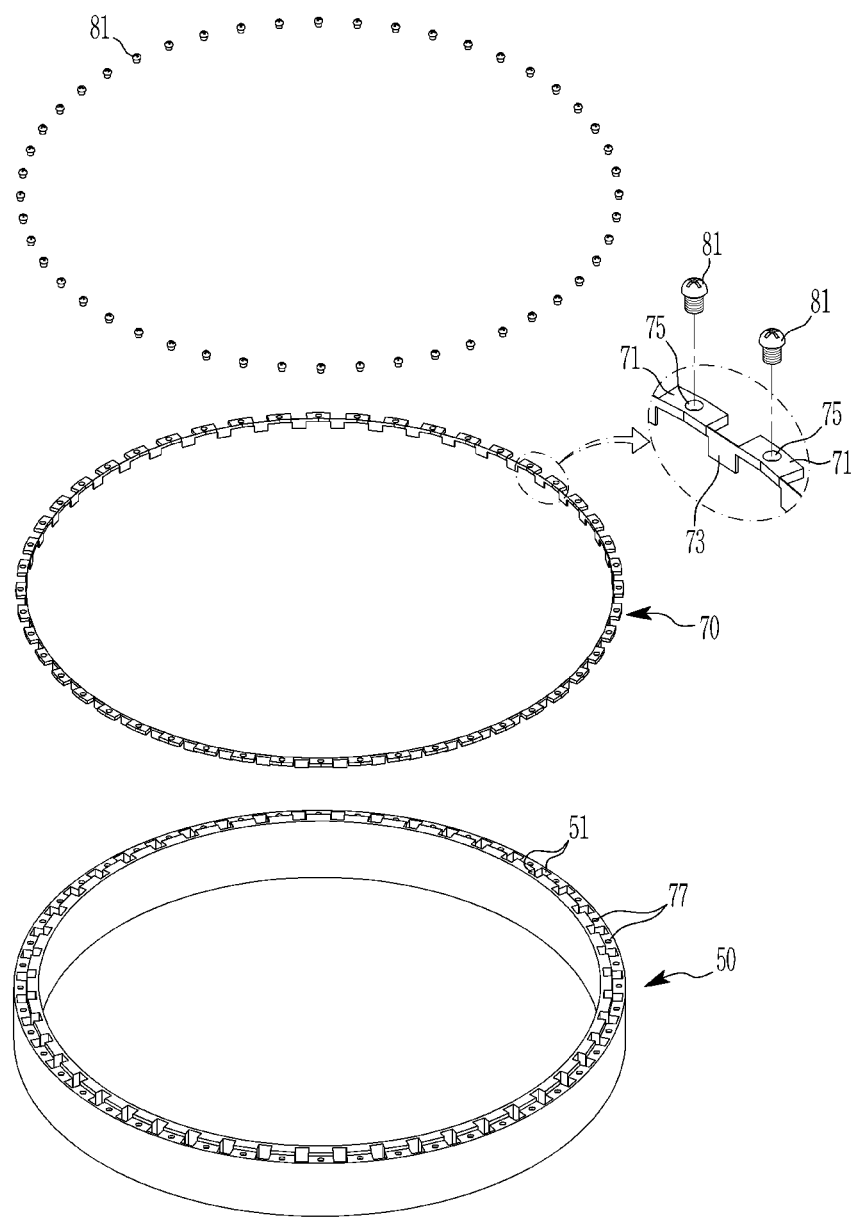
FIG. 4 is a combined perspective view showing the structure of the twisting jig and the partition member applied to an apparatus for twisting welding portions of segment type stator coils according to an exemplary embodiment.
Figure 5:
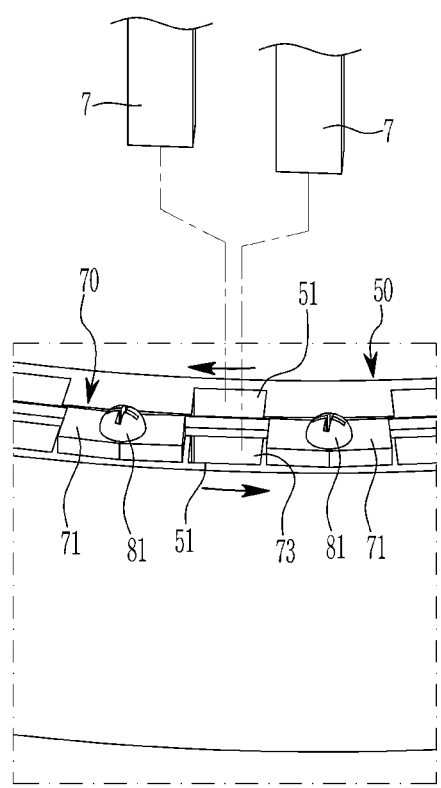
FIG. 5 is an enlarged partial perspective view showing a combining structure of a twisting jig and a partition member applied to an apparatus for twisting welding portions of segment type stator coils according to an exemplary embodiment.

FIG. 4 is a combined perspective view showing the structure of the twisting jig and the partition member applied to an apparatus for twisting welding portions of segment type stator coils according to an exemplary embodiment. FIG. 5 is an enlarged partial perspective view showing a combining structure of a twisting jig and a partition member applied to an apparatus for twisting welding portions of segment type stator coils according to an exemplary embodiment.

Referring to FIG. 4 and FIG. 5, the twisting jig 50 according to an exemplary embodiment is provided for each layer of the stator coils 7 along the radial direction of the stator core 3.

Here, the twisting jigs 50 is provided in a number corresponding to the number of layers of the stator coils 7 and each twisting jig 50 is formed in a ring shape. For example, the twisting jig 50 corresponding to the first layer of the stator coils 7 is provided on the outermost side, and the twisting jigs 50 corresponding to the second, third, fourth, fifth, and sixth layers are sequentially provided inside the outermost twisting jig 50. Such may be obviously understood although the drawing illustrates that, for convenience of explanation, only a pair of twisting jigs 50 corresponding to the first and second layers of the stator coil 7 are illustrated to face each other.

The twisting jig 50 is rotatably installed on the frame 10, rotatable in a different direction for each layer of the stator coils 7. That is, the twisting jigs 50 for odd-numbered layers of the stator coils 7 are rotatable in different direction from the twisting jigs 50 for even-numbered layers of the stator coils 7.

Each twisting jig 50 forms coil receiving recesses 51 along a circumferential direction, facing another twisting jig 50 that forms a pair. That is, if a first twisting jig 50 forms coil receiving recesses 51 toward a second twisting jig 50, the second twisting jig 50 forms coil receiving recesses 51 toward the first twisting jig 50. The coil receiving recesses 51 are the parts where the welding portion 9 of the stator coils 7 is inserted, and are formed in the up and down directions on the exterior circumference side of the twisting jigs 50. The coil receiving recesses 51 are portions into which the welding portions 9 of the stator coils 7 are inserted, and are formed an exterior circumference surface of the twisting jigs 50 in the up and down direction.

As described above, the coil receiving recess 51 is formed on adjacent surfaces of a pair of twisting jigs 50 facing each other. That is, the coil receiving recess 51 is formed on the inner circumference of one twisting jig 50 and is formed on the exterior circumference of another twisting jig 50. The coil receiving recesses 51 formed on the pair of twisting jigs 50 may face each other to be combined to form a passage or pocket.

Referring to FIG. 1, in an exemplary embodiment, the driving unit 60 is for rotating the twisting jigs 50 for the odd-numbered layers of the stator coils 7 in a different direction from the twisting jigs 50 for the even-numbered layers of the stator coils 7.

Figure 6:
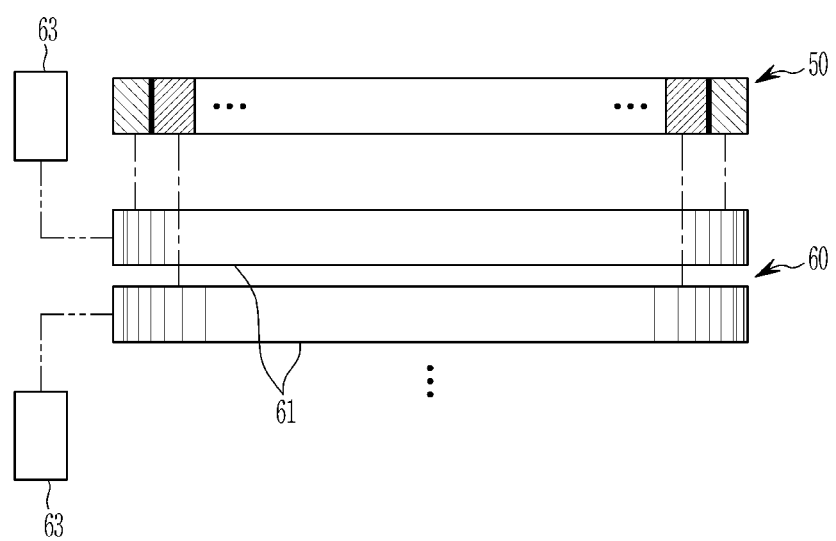
FIG. 6 schematically illustrates a driving unit applied to an apparatus for twisting welding portions of segment type stator coils according to an exemplary embodiment.

The driving unit 60 is installed on the frame 10 to be connected to the twisting jigs 50. As shown in FIG. 6, such driving unit 60 includes drive gear members 61 and servo-motors 63.

The drive gear members 61 are disposed on the frame 10 along the up and down direction, and are respectively connected to the twisting jigs 50. The servo-motors 63 are motors capable of being servo controlled for rotating direction and rotation speed, and are respectively connected to the drive gear members 61. The servo-motor 63 may be gear-engaged with the drive gear member 61 via a drive shaft.

Referring to FIG. 4 and FIG. 5, in an exemplary embodiment, the partition member 70 may block the coil receiving recesses 51 facing each other of the twisting jigs 50 forming a pair, and may be detachably provided at one of the pair of neighboring twisting jigs 50. The partition member 70 is provided in a generally ring shape, and may be engaged on the upper surface of the twisting jig 50 by a bolt 81.

The partition member 70 is generally ring shaped, and integrally forms bolt engagement portions 71 and partition walls 73. The bolt engagement portions 71 are disposed on the upper surface of the twisting jig 50 in the horizontal direction interposing the coil receiving recesses 51, and engaged on the upper surface of the twisting jig 50 by the bolt 81.

Here, bolt engagement holes 75 are formed in the bolt engagement portions 71, respectively. In addition, a bolt engagement recesses 77 connected to the bolt engagement holes 75 is formed in the upper surface of the twisting jig 50.

Accordingly, the partition member 70 may be fixedly coupled to the upper surface of the twisting jig 50 while the bolts 81 are engaged to the bolt engagement recesses 77 through the bolt engagement holes 75.

In addition, the partition walls 73 disposed between the bolt engagement portions 71 are integrally connected to bolt engagement portions 71, and are disposed in the vertical direction (vertical direction to the bolt engagement portions 71) between the coil receiving recesses 51 facing each other of the twisting jigs 50.

In the above, the partition wall 73 is disposed between the twisting jigs 50 forming the pair, and may separate the coil receiving recesses 51, which has been combined to form one passage or pocket, of the paired twisting jigs 50 into two passages or pockets.

Hereinafter, an operation of the apparatus 100 for twisting welding portions of a segment type stator coil according to an exemplary embodiment is described in detail reference to the drawings.

First, in an exemplary embodiment, the hairpin type stator coils 7 are inserted into the slots of the stator core 3. Here, the stator coils 7 are inserted into the slots of the stator core 3 along the radial direction, and the welding portions 9 at the inserted ends protrudes penetrating the slots.

In such a state, in an exemplary embodiment, the inner circumference of the stator core 3 is gripped by the core gripper 20. At this time, the first fixing members 34 of the crown portion fixing jig 30 are moved backward along the guide rail 33 on the first fixed rail plate 31. In addition, the cam follower protrusion 35 of the first fixing member 34 is supported by the cam follower rail 39 of the first movable rail plate 37.

Subsequently, in an exemplary embodiment, when the first movable rail plate 37 is rotated in one direction, the rotational movement of the first movable rail plate 37 is converted to the linear movement of the first fixing members 34 by the cam operation of the cam follower rail 39 and the cam follower protrusion 35.

Therefore, in an exemplary embodiment, the first fixing members 34 are moved forward through the guide rail 33 on the first fixed rail plate 31, and the first fixing members 34 are inserted between the crown portions 8 of the stator coils 7, thereby fixing the crown portion 8.

In such a state, in an exemplary embodiment, the stator core 3 is moved downward through the core gripper 20, and the welding portions 9 of the stator coils 7 are inserted into the coil receiving recesses 51 of the twisting jigs 50, for each layer of the stator coils 7.

Here, the partition member 70 is engaged with one of the paired twisting jigs 50 by the bolts 81 through the bolt engagement portions 71. In addition, the partition wall 73 of the partition member 70 is vertically disposed between the coil receiving recesses 51 of the paired twisting jigs 50 facing each other, and separates the coil receiving recess 51, which has been combined to form one passage or pocket, into two passages or pockets.

Accordingly, the welding portions 9 of the stator coils 7 are respectively inserted into the coil receiving recesses 51 of the twisting jig 50 interposing the partition wall 73 of the partition member 70, for each layer of the stator coils 7.

Furthermore, the second fixing members 44 of the welding portion fixing jig 40 are moved backward along the guide rail 43 on the second fixed rail plate 41. In addition, the cam follower protrusion 45 of the second fixing members 44 is supported by the cam follower rail 49 of the second movable rail plate 47.

In an exemplary embodiment, while the welding portions 9 of the stator coils 7 are respectively inserted into the coil receiving recesses 51 of the twisting jig 50, the second movable rail plate 47 is rotated. Then, in an exemplary embodiment, the rotational movement of the second movable rail plate 47 is converted to the linear movement of the second fixing members 44 by the cam operation of the cam follower rail 49 and the cam follower protrusion 45.

Therefore, in an exemplary embodiment, the second fixing members 44 are moved forward through the guide rail 43 on the second fixed rail plate 41, and the second fixing members 44 are inserted between the welding portions 9 of the stator coils 7, thereby fixing the welding portions 9.

Then, in an exemplary embodiment, the twisting jigs 50 are rotated in different directions for the odd-numbered layers and even-numbered layers of the stator coils 7, by the driving unit 60.

Therefore, in an exemplary embodiment, while the welding portions 9 of the stator coils 7 are inserted into the coil receiving recesses 51 of the twisting jigs 50, the twisting jigs 50 are rotated in different directions for each layer of the stator coils 7, and therefore, the welding portions 9 may be twisted while supporting the welding portions 9 by the interior surfaces of the coil receiving recesses 51 and the partition walls 73 of the partition member 70.

Meanwhile, in an exemplary embodiment, damage to the partition member 70 may occur in the process of twisting and forming the welding portions 9 of the stator coils 7 through a series of processes as described above and a reverse process.

In this case, in an exemplary embodiment, the damaged partition member 70 may be separated from the twisting jig 50 by loosening the bolt 81, and a new partition member 70 may be mounted on the twisting jig 50.

According to the apparatus 100 for twisting welding portions of a segment type stator coil according to an exemplary embodiment as described above, the coil receiving recesses 51 of the twisting jigs 50 are designed in an open structure, such that a pocket wall as in the conventional art is removed, and instead, the separate partition member 70 is employed to partition the coil receiving recesses 51 between the twisting jigs 50, thereby securing the strength of the twisting jigs 50.

Therefore, in an exemplary embodiment, by separately applying the partition member 70, the twisting quality of the welding portions 9 may be improved, and the risk of damage of the twisting jig 50 may be minimized.

In addition, in an exemplary embodiment, when the partition member 70 is damaged, only the partition member 70 may be replaced without replacing the entire the twisting jig 50. Therefore, the cost of replacing the entire the twisting jig 50 may be reduced and the maintenance of twisting jig 50 becomes easy, and the easy maintenance of the twisting jig 50 may be improved.

Figure 7:
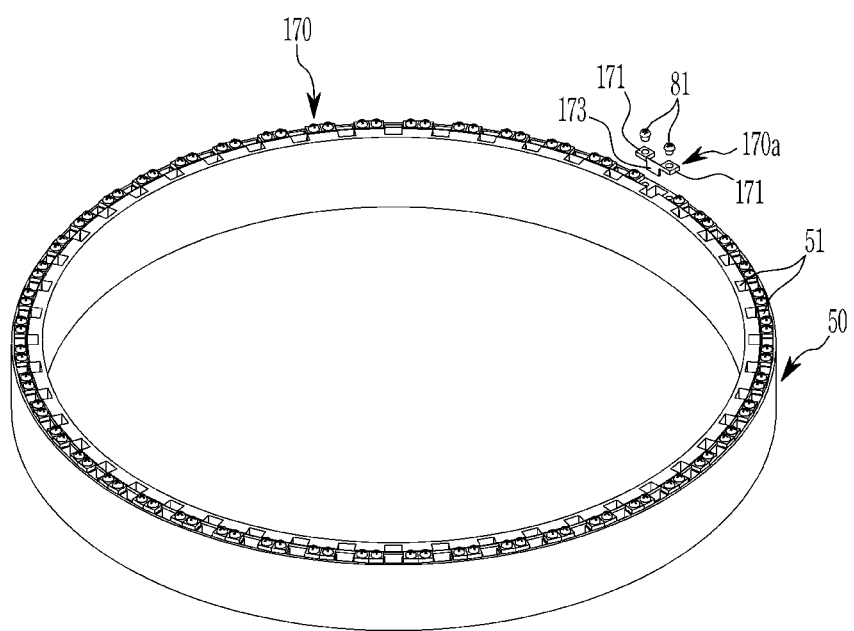
FIG. 7 and FIG. 8 illustrate an exemplary variation of the partition member applied to an apparatus for twisting welding portions of segment type stator coils according to an exemplary embodiment.
Figure 8:
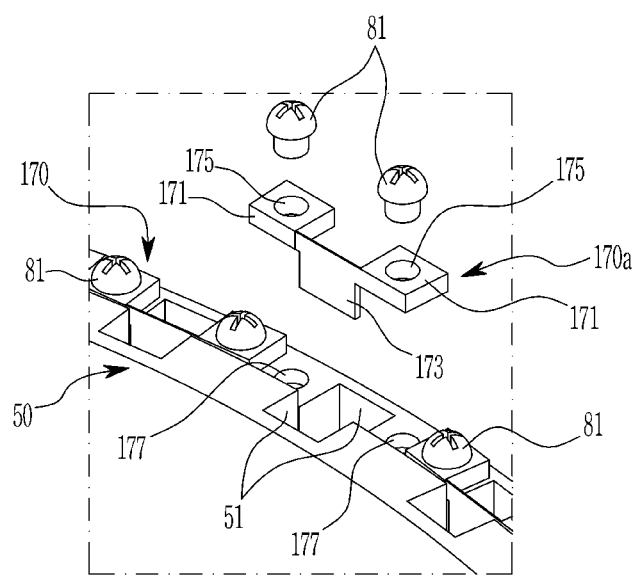

FIG. 7 and FIG. 8 illustrate an exemplary variation of the partition member applied to an apparatus for twisting welding portions of segment type stator coils according to an exemplary embodiment.

Referring to FIG. 7 and FIG. 8, the partition member 170 according to the present exemplary variation may include a plurality of unit partitions 170a engaged with the upper surface of the twisting jig 50 by the bolt 81, along the circumferential direction of the twisting jig 50. That is, the partition member 170 of the present exemplary variation includes the unit partitions 170a which are a plurality of pieces.

Such a unit partition 170a integrally forms a pair of bolt engagement portions 171 and a single partition wall 173. The pair of bolt engagement portions 171 are horizontally disposed on the upper surface of the twisting jig 50 interposing the coil receiving recess 51 of the twisting jig 50, and engaged with the upper surface of the twisting jig 50 by the bolt 81.

Here, a bolt engagement hole 175 is formed to the pair of bolt engagement portions 171, respectively. In addition, bolt engagement recesses 177 respectively connected to the bolt engagement holes 175 are formed on the upper surface of the twisting jig 50.

Accordingly, the unit partitions 170a may be fixedly coupled on the upper surface of the twisting jig 50 along the circumferential direction, by the bolt 81 engaged with the bolt engagement recess 177 through the bolt engagement hole 175.

In addition, the partition wall 173 is disposed between the pair of bolt engagement portions 171 and integrally connected to the bolt engagement portions 171. In addition, the partition wall 173 is vertically disposed between the coil receiving recesses 51 of the twisting jigs 50.

In the above, the partition wall 173 separates the coil receiving recess 51 of the paired twisting jigs 50, which has been combined to form one passage or pocket, into two passages or pockets.

Accordingly, in an exemplary embodiment, as the unit partitions 170a in the form of pieces constitutes the partition member 170 engaged with the twisting jig 50 by the bolt 81, when damage to the partition member 170 occurs, only the unit partition 170a corresponding to the damaged area may be replaced, and therefore, the easy maintenance of the twisting jig 50 may be achieved.

Figure 9:
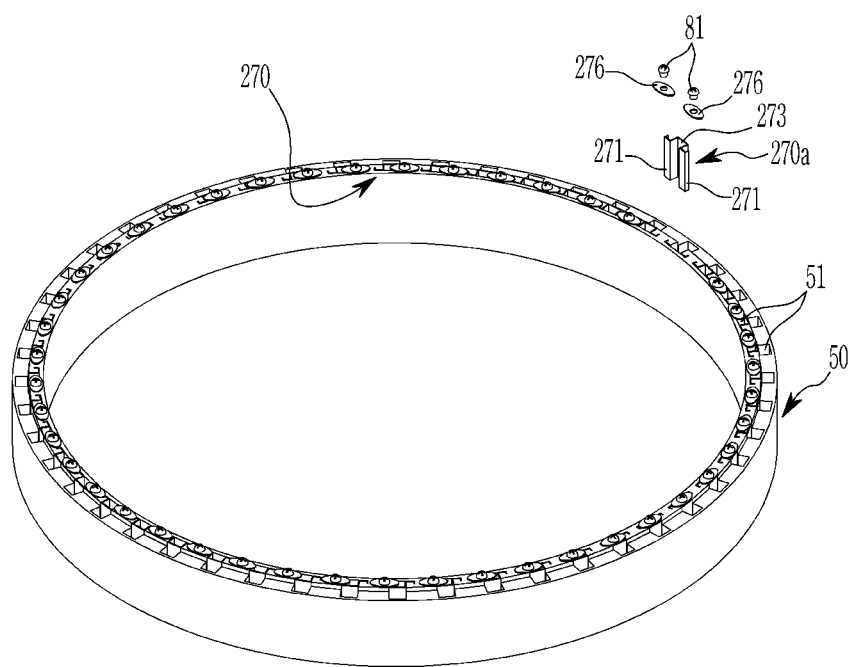
FIG. 9 and FIG. 10 illustrate another exemplary variation of the partition member applied to an apparatus for twisting welding portions of segment type stator coils according to an exemplary embodiment.
Figure 10:
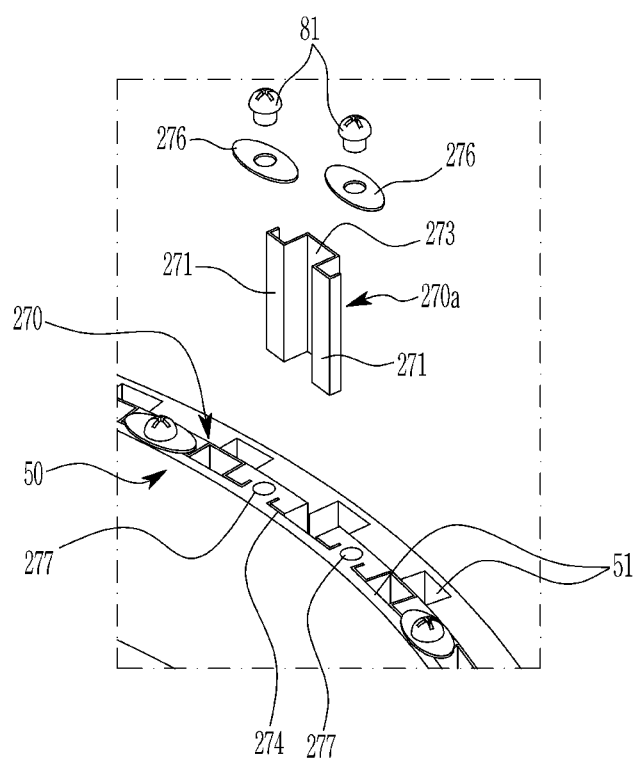

FIG. 9 and FIG. 10 illustrate another exemplary variation of the partition member applied to an apparatus for twisting welding portions of segment type stator coils according to an exemplary embodiment.

Referring to FIG. 9 and FIG. 10, the partition member 270 according to the exemplary variation may include a plurality of unit partitions 270a that are disposed along the circumferential direction of the twisting jig 50 and inserted from the upper surface of the twisting jig 50 toward the lower surface. That is, the partition member 270 of the present exemplary variation includes the unit partitions 270a, which are a plurality of pieces.

In the present exemplary variation, the unit partitions 270a are provided as a plate type in which a central portion is bent in a thickness direction of the twisting jig 50. Each of such unit partitions 270a integrally forms a pair of insertion portions 271 and an single partition wall 273.

The pair of insertion portions 271 are provided on both sides of the central portion of the unit partition 270a, and are inserted into the twisting jig 50 in the up and down direction from both sides of the coil receiving recess 51 of the twisting jig 50, interposing the coil receiving recess 51 of the twisting jig 50.

The partition wall 273 is a central portion that is disposed between and integrally connected to the pair of insertion portions 271, and is vertically disposed between the coil receiving recesses 51 facing each other of the twisting jigs 50.

Here, the pair of insertion portions 271 is connected to both sides of the partition wall 273 along the circumferential direction of the twisting jig 50 and is bent in the thickness direction of the twisting jig 50. That is, the partition wall 273 is provided in an open end form, e.g., in a C shaped form.

In addition, an insertion slit 274 into which the insertion portion 271 may be inserted is formed downward from the upper surface the twisting jig 50, interposing with the coil receiving recess 51. The pair of insertion portions 271 are inserted downward into the insertion slits 274 while disposing the partition wall 273 inside the coil receiving recess 51.

Furthermore, the neighboring insertion portions 271 of the unit partitions 270a are fixed by washers 276, and the washers 276 are engaged with the upper surface of the twisting jig 50 through the bolts 81. In addition, bolt engagement recesses 277 to be engaged with the bolts 81 through the washers 276 are formed in the upper surface of the twisting jig 50.

Therefore, the unit partitions 270a are inserted downward into the insertion slit 274 of the twisting jig 50 through the insertion portions 271, and the partition wall 273 of the unit partition 270a is vertically disposed between the coil receiving recesses 51 facing each other of the twisting jigs 50.

In such a state, in the present exemplary variation, the washers 276 are disposed above the neighboring insertion portions 271 on the upper surface of the twisting jig 50, and the bolts 81 are engaged with the bolt engagement recesses 277 of the upper surface of the twisting jig 50 through the washers 276. Accordingly, the unit partitions 270a may be fixedly couple with the twisting jig 50 along the circumferential direction.

Accordingly, in an exemplary embodiment, the partition member 270 is configured such that the unit partitions 270a in the form of pieces are inserted into the twisting jig 50, and the unit partitions 270a are engaged with the twisting jig 50 by the washers 276 and the bolts 81. Therefore, in the case of damage to the partition member 270, the unit partition 270a corresponding to the damaged area may only be replaced, and easy maintenance of the twisting jig 50 may be achieved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An apparatus for twisting welding portions of segment type stator coils, the welding portions being in a plurality of layers and inserted into slots of a stator core, the apparatus comprising:
   a frame;
   a plurality of twisting jigs, each of which is provided for each layer of the stator coils, along a radial direction of the stator core, forming coil receiving recesses along a circumferential direction facing another twisting jig forming a pair, installed on the frame to be rotatable in different directions depending on layers of the stator coils, and is generally ring-shaped; and
   a partition member detachably provided at one of a pair of neighboring twisting jigs, and blocking the coil receiving recesses facing each other of the twisting jigs forming the pair, wherein the partition member comprises:
      bolt engagement portions horizontally disposed on an upper surface of a twisting jig of the pair of neighboring twisting jigs and bolt-engaged with the upper surface of the twisting jig of the pair of neighboring twisting jigs; and
      a partition wall disposed between the bolt engagement portions and integrally connected to the bolt engagement portion, and vertically disposed between the coil receiving recesses facing each other of the twisting jigs.

2. The apparatus of claim 1, further comprising:
   a driving unit installed on the frame and rotating the plurality of twisting jigs in different directions for odd-numbered layers and even-numbered layers of the stator coils.

3. The apparatus of claim 2, wherein the driving unit comprises:
   a plurality of drive gear members disposed on the frame along an up and down direction and respectively connected to the plurality of twisting jigs; and
   a plurality of servo-motors respectively connected to the plurality of drive gear members.

4. An apparatus for twisting welding portions of segment type stator coils, the welding portions being in a plurality of layers and inserted into slots of a stator core, the apparatus comprising:
   a frame;
   a core gripper installed on an upper side of the frame to be movable in an up and down direction and gripping an inner circumference of the stator core;
   a crown portion fixing jig installed on the core gripper and configured to fix a crown portion at an upper side of the stator coils;
   a welding portion fixing jig installed on the frame and configured to fix the welding portions of the stator coils;
   a plurality of twisting jigs, each of which is provided for each layer of the stator coils, along a radial direction of the stator core, forming coil receiving recesses along a circumferential direction facing another twisting jig forming a pair, installed on the frame to be rotatable in different directions depending on layers of the stator coils, and is generally ring-shaped; and
   a partition member detachably provided at one of a pair of neighboring twisting jigs, and blocking the coil receiving recesses facing each other of the twisting jigs forming the pair.

5. The apparatus of claim 4, wherein the crown portion fixing jig comprises:

first fixing members provided on the core gripper to be movable radially back and forth and inserted between the crown portions.

6. The apparatus of claim 5, wherein the welding portion fixing jig comprises:
second fixing members provided on the frame to be movable radially back and forth and inserted between the welding portions of the stator coils.

7. The apparatus of claim 4, wherein the welding portion fixing jig comprises:
second fixing members provided on the frame to be movable radially back and forth and inserted between the welding portions of the stator coils.

8. The apparatus of claim 4, further comprising a driving unit installed on the frame and rotating the plurality of twisting jigs in different directions for odd-numbered layers and even-numbered layers of the stator coils,
wherein the driving unit comprises:
a plurality of drive gear members disposed on the frame along an up and down direction and respectively connected to the plurality of twisting jigs; and
a plurality of servo-motors respectively connected to the plurality of drive gear members.

9. The apparatus of claim 4, wherein the partition member is provided in a generally ring shape and is bolt-engaged with an upper surface of the one of the pair of neighboring twisting jigs.

10. The apparatus of claim 9, wherein the partition member comprises single generally ring shaped member.

11. The apparatus of claim 10, wherein the partition member comprises:
bolt engagement portions horizontally disposed on the upper surface of the one of the pair of neighboring twisting jigs and bolt-engaged with the upper surface of the one of the pair of neighboring twisting jigs; and
a partition wall disposed between the bolt engagement portions and integrally connected to the bolt engagement portion, and vertically disposed between the coil receiving recesses facing each other of the twisting jigs.

12. The apparatus of claim 4, wherein the partition member comprises a plurality of unit partitions that are bolt-engaged with an upper surface of the one of the pair of neighboring twisting jigs along the circumferential direction of the one of the pair of neighboring twisting jigs.

13. The apparatus of claim 12, wherein each unit partition comprises:
a pair of bolt engagement portions that are horizontally disposed on the upper surface of the one of the pair of neighboring twisting jigs and bolt-engaged with the upper surface of the one of the pair of neighboring twisting jigs; and
a partition wall that is disposed between and integrally connected to the pair of bolt engagement portions, and is vertically disposed between the coil receiving recesses facing each other of the twisting jigs.

14. The apparatus of claim 13, wherein:
a bolt engagement hole is formed in the pair of bolt engagement portions; and
a bolt engagement recess connected to the bolt engagement hole is formed on the upper surface of the one of the pair of neighboring twisting jigs.

15. An apparatus for twisting welding portions of segment type stator coils, the welding portions being in a plurality of layers and inserted into slots of a stator core, the apparatus comprising:
a frame:
a core gripper installed on an upper side of the frame to be movable in an up and down direction and gripping an inner circumference of the stator core;
a crown portion fixing jig installed on the core gripper and configured to fix a crown portion at an upper side of the stator coils;
a welding portion fixing jig installed on the frame and configured to fix the welding portions of the stator coils;
a plurality of twisting jigs, each of which is provided for each layer of the stator coils, along a radial direction of the stator core, forming coil receiving recesses along a circumferential direction facing another twisting jig forming a pair, installed on the frame to be rotatable in different directions depending on layers of the stator coils, and is generally ring-shaped; and
a partition member detachably provided at one of a pair of neighboring twisting jigs, and blocking the coil receiving recesses facing each other of the twisting jigs forming the pair, wherein the partition member comprises a plurality of unit partitions that are disposed along the circumferential direction of the one of the pair of neighboring twisting jigs and inserted from an upper surface of the one of the pair of neighboring twisting jigs toward lower surface.

16. The apparatus of claim 15, wherein each unit partition is provided as a plate type in which a central portion is bent in a thickness direction of the one of the pair of neighboring twisting jigs.

17. The apparatus of claim 16, wherein each unit partition comprises:
a pair of insertion portions provided at both sides of the central portion and inserted into the one of the pair of neighboring twisting jigs in the up and down direction interposing the coil receiving recess; and
a partition wall that is a central portion disposed between and integrally connected to the pair of insertion portions, and vertically disposed between the coil receiving recesses facing each other of the twisting jigs.

18. The apparatus of claim 17, wherein:
the insertion portion is connected to both sides of the partition wall along the circumferential direction of the one of the pair of neighboring twisting jigs and bent in a thickness direction of the one of the pair of neighboring twisting jigs; and
the partition wall is provided in an open end form.

19. The apparatus of claim 17, wherein an insertion slit into which the insertion portion is inserted is formed downward from the upper surface of the one of the pair of neighboring twisting jigs.

20. The apparatus of claim 17, wherein:
neighboring insertion portions of the unit partitions are fixed by washers; and
the washers are bolt-engaged with the upper surface of the one of the pair of neighboring twisting jigs.

* * * * *